April 7, 1925.
S. E. SHEPPARD ET AL
FLUORESCENT SCREEN
Filed Feb. 1, 1924
1,532,783
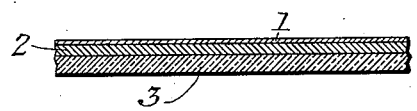
Inventors.
Samuel E. Sheppard
and Leon W. Eberlin.
BY R. L. Stinchfield
N. M. Pirnie
ATTORNEYS.

Patented Apr. 7, 1925.

1,532,783

UNITED STATES PATENT OFFICE.

SAMUEL E. SHEPPARD AND LEON W. EBERLIN, OF ROCHESTER, NEW YORK, ASSIGNORS TO EASTMAN KODAK COMPANY, OF ROCHESTER, NEW YORK, A CORPORATION OF NEW YORK.

FLUORESCENT SCREEN.

Application filed February 1, 1924. Serial No. 690,071.

*To all whom it may concern:*

Be it known that we, SAMUEL E. SHEPPARD and LEON W. EBERLIN, subject of the King of Great Britain and citizen of the United States of America, respectively, residing at Rochester, in the county of Monroe and State of New York, have invented certain new and useful Improvements in Fluorescent Screens, of which the following is a full, clear, and exact specification.

This invention relates to fluorescent screens used to intensify the image produced on a sensitive plate or film by X-rays and to methods for making the same, and more particularly to certain improvements in the screen disclosed in our application, Serial No. 606,942, filed Dec. 14, 1922.

The screen there described comprises an active layer with a thin protective front layer and a thick rear protective layer, fine metallic particles being incorporated in the latter in suspension.

The front layer was formed preferably by pouring on a polished glass table and the finished screen had a very smooth glossy front surface. It was found that this glossy surface showed scratches and abrasion marks very readily, and that these affected the salability of the articles though their efficiency was not materially affected. After sale, constant use naturally caused abrasion marks.

We have found that it is possible to give a matte surface to this protective layer, upon which small scratches or abrasion marks are not apparent, but without affecting the washability of the screen. This is done by incorporating therein in suspension a relatively small quantity of a salt, preferably fluorescent. The presence of the salt renders the layer light-diffusing and its surface matte, even though the layer is formed on a polished glass surface.

It is not necessary in this specification to state all the details incident to the making of a complete screen, as these are similar to the procedure given in the above mentioned application. For the protective layer the same compositions there mentioned may be used. The amount of salt to be added may vary as the surface becomes more matte as more salt is used. We have found that a very useful proportion is twenty ounces of very finely divided calcium tungstate to one gallon of the facing solution. When the volatile solvents have evaporated there is left a coating of which about 43% by weight is the tungstate. If more than 50% by weight is used, the surface becomes so rough that it dirties more easily and is not easily cleanable.

It is to be noted that the proportion of cellulosic material used in the protective coating is altogether different from that used in the active layer. As was pointed out in the application referred to, the proportion by weight in the active layer is not over 5% and preferably but 1 or 2%. Furthermore, as was also pointed out in that application, different cellulosic compositions are used in the two layers and the protective layer is very much thinner than the active layer. The proportion of fluorescent material used in the protective layer is not sufficient in itself to constitute an efficient active screen, though it renders the screen as a whole slightly more efficient.

However, inert materials, in powdered form, rendering the protective coat light diffusing, but not materially affecting the passage of X-rays, may be used.

The proportion of fluorescent salt necessary in the active layer to attain the best efficiency is so great that the active layer is fragile and the addition of a protective coating is very desirable to render the screen durable and washable. By our invention we not only attain these results but maintain the appearance of the screen and improve its efficiency.

The screen is preferably made in the manner described in that application, by pouring over a smooth glass surface the facing material, and then successively pouring the active layer and the supporting material.

In the accompanying drawing the front protective layer is designated as 1, the active layer as 2, and the supporting layer as 3.

The finished screen is more or less matte or light diffusing on both surfaces, the front surface appearing white and the rear surface having a distinguishing metallic lustre.

We contemplate as included within our invention all such modifications and equivalents as fall within the scope of the appended claims.

Having thus described our invention, what we claim as new and desire to secure by Letters Patent is:

1. An X-ray fluorescent screen comprising an active layer, a rear supporting layer, and a front protective layer, the front protective layer comprising a cellulosic composition carrying in suspension finely divided light-diffusing material.

2. An X-ray fluorescent screen comprising an active layer, a rear supporting layer, and a front protective layer, the front protective layer comprising a cellulosic composition carrying in suspension a metallic salt.

3. An X-ray fluorescent screen comprising an active layer, a rear supporting layer, and a front protective layer, the front protective layer comprising a cellulosic composition carrying in suspension a fluorescent metallic salt.

4. An X-ray fluorescent screen comprising an active layer, a rear supporting layer, and a front protective layer, the front protective layer comprising a cellulosic composition carrying in suspension a fluorescent metallic salt, the proportion of the salt to the cellulosic composition being less than 50% by weight.

5. An X-ray fluorescent screen comprising an active layer, a rear supporting layer and a front protective layer, the active layer comprising a fluorescent salt in a cellulosic binder, the weight of the binder being not over 5% of the weight of the salt, and the protective layer comprising a cellulosic composition carrying in suspension a fluorescent metallic salt, the proportion of the salt to the composition being not over 50% by weight.

6. An X-ray fluorescent screen comprising an active layer, a rear supporting layer and a front protective layer, the active layer comprising a fluorescent salt in a cellulosic binder, the weight of the binder being not over 5% of the weight of the salt, and the protective layer comprising a cellulosic composition carrying in suspension finely powdered calcium tungstate, the proportion of the salt to the composition being not over 50% by weight.

7. An X-ray fluorescent screen comprising an active layer, a rear supporting layer and a front protective layer, the active layer comprising a fluorescent salt in a cellulosic binder, the weight of the binder being not over 5% of the weight of the salt, and the protective layer comprising a cellulosic composition carrying in suspension a fluorescent metallic salt, different cellulosic materials being used as the binder in the active layer and as the composition in the protective layer.

8. An X-ray fluorescent screen comprising an active layer, a front protective layer and a supporting layer. both surfaces of the screen being matte and the rear surface having a metallic lustre.

9. The method of making a fluorescent screen with a matte protective surface comprising pouring on a polished surface a composition comprising a cellulosic compound in a solvent and carrying in suspension a salt, permitting said solution to dry, thereby forming a film layer, and then flowing thereover a composition comprising a cellulosic compound in a solvent and carrying in suspension a fluorescent salt.

10. The method of making a fluorescent screen with a matte protective surface comprising pouring on a polished surface a composition comprising a cellulosic compound in a solvent and carrying in suspension a fluorescent salt, permitting said solution to dry, thereby forming a thin film layer, and then flowing thereover a second composition comprising a different cellulosic compound in a solvent and carrying in suspension a fluorescent salt and permitting said second solution to dry, thereby forming a layer in adherence with the first layer, and stripping said layers together from the polished surface.

Signed at Rochester, New York, this 28th day of Jan., 1924.

SAMUEL E. SHEPPARD.
LEON W. EBERLIN.